US006754406B2

(12) United States Patent
Kaneshiro et al.

(10) Patent No.: US 6,754,406 B2
(45) Date of Patent: Jun. 22, 2004

(54) PASSIVELY ALIGNED FIBER OPTICAL ENGINE FOR PARALLEL OPTICS INTERCONNECT DEVICES

(75) Inventors: Ronald Kaneshiro, Los Altos, CA (US); Y Man Teng, Saratoga, CA (US); Matthew Heydinger, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 131 days.

(21) Appl. No.: 10/056,099

(22) Filed: Jan. 22, 2002

(65) Prior Publication Data

US 2003/0138186 A1 Jul. 24, 2003

(51) Int. Cl.[7] .................................................. G02B 6/12

(52) U.S. Cl. ............................. 385/14; 385/52; 385/88; 385/90; 385/91; 438/29

(58) Field of Search ............................. 385/14, 15, 52, 385/88, 90, 91; 438/29

(56) References Cited

U.S. PATENT DOCUMENTS

| 5,638,469 | A | * | 6/1997 | Feldman et al. | ............... | 385/14 |
|---|---|---|---|---|---|---|
| 6,164,837 | A | * | 12/2000 | Haake et al. | .................. | 385/90 |
| 6,203,212 | B1 | * | 3/2001 | Rosenberg et al. | ........... | 385/92 |
| 6,477,286 | B1 | * | 11/2002 | Ouchi | .......................... | 385/14 |
| 6,516,104 | B1 | * | 2/2003 | Furuyama | ..................... | 385/14 |
| 6,522,798 | B2 | * | 2/2003 | Chiappetta et al. | ........... | 385/14 |
| 6,574,399 | B2 | * | 6/2003 | Boudreau et al. | ............. | 385/49 |
| 2002/0150319 | A1 | * | 10/2002 | Antaki et al. | .................. | 385/14 |
| 2002/0154869 | A1 | * | 10/2002 | Chan et al. | ................... | 385/88 |
| 2003/0068141 | A1 | * | 4/2003 | Velsher et al. | ................ | 385/92 |
| 2003/0091301 | A1 | * | 5/2003 | Lee et al. | ...................... | 385/89 |

* cited by examiner

*Primary Examiner*—Akm Enayet Ullah
*Assistant Examiner*—Daniel Petkovsek

(57) ABSTRACT

A fiber optical engine and manufacturing method therefor is provided with an optical element having an optical substrate and optics. An opto-electronic element, which converts between light and electronic signals, is secured to the optical substrate and is passively aligned with the optics. A integrated circuit for controlling the opto-electronic element is secured to the optical substrate. An electrical substrate is secured to the optical element.

20 Claims, 4 Drawing Sheets

PASSIVELY ALIGNED FIBER OPTICAL ENGINE FOR PARALLEL OPTICS INTERCONNECT DEVICES

BACKGROUND

1. Technical Field

The present invention relates generally to parallel optics interconnect devices and more specifically to fiber optical engines.

2. Background Art

In the transmission of signals by optical fibers, it is necessary to convert the optical signal composed of light or photons into electrical signals and electrical signals into optical signals.

The vast majority of products on the market today for accomplishing the conversion between optical and electrical signals utilize a combination of discrete components. The discrete components include active and passive elements. Active elements for transmitters use discrete light-emitting devices, which could be light-emitting diodes or lasers, to convert electric signals into optical signals. Often, the lasers are semiconductor lasers of either an edge emitting or surface emitting nature. Active elements for receivers use photodetectors to convert optical signals back into electrical signals. Passive elements are discrete lens elements that could include conventional refractive optics or diffractive optics. In fiber optics the lens elements are of a very sophisticated nature generated using computers, and are typically called "computer-generated" optics. In addition, sophisticated electronics are required, usually in the form of integrated circuits, which once again have active and passive elements.

Because the current designs are a conglomeration of discrete elements, there are multiple packages that contain the various elements. This causes farther problems in parasitic inductance and capacitance introduced by the packages, which leads to performance limitations.

All the elements must be assembled in a very precise manner into modules. Typically, all the elements need to be aligned and placed to better than several microns accuracy in a high volume manufacturing environment. Therefore, manufacturing as well as the design of these modules is extremely difficult and time consuming, as well as low yielding.

The leading edge of the art for fiber optical devices today is 10 gigabits per second in a single serial channel. It requires a very expensive and exotic design and is not amenable for high volume manufacturing.

Recently, a new market has been developing, which is called parallel optics where a single fiber optical module contains multiple channels of optical paths. All of the current products are single channel receive-only, transmit-only, or receive-and-transmit within a single module. New parallel optics require up to twelve channels in a same physical space as a single channel module. This presents a major roadblock since conventional designs and manufacturing techniques have been found to be inadequate to meet the physical space challenges while maintaining any significant degree of manufacturability. Yield is low which means the end-product cost is extremely high.

Solutions to these problems have been long sought, but have long eluded those skilled in the art.

DISCLOSURE OF THE INVENTION

The present invention provides for a fiber optical engine and manufacturing method therefor with an optical element having an optical substrate and optics. An opto-electronic element, which converts between light and electronic signals, is secured to the optical substrate and is passively aligned with the optics. An integrated circuit for controlling the opto-electronic element is secured to the optical substrate. An electrical substrate is secured to the optical element. The fiber optical engine is capable of high giga-Hertz (GHz) frequency operation while being manufactured using commercially available materials, equipment, and high volume production processes. It can also be made smaller and requires less alignment work than conventional systems.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
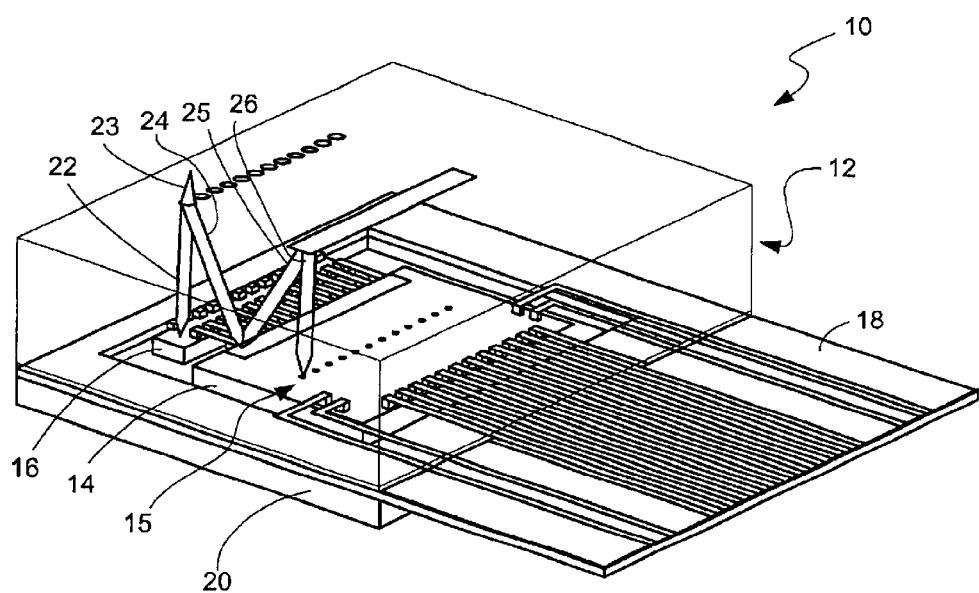
FIG. 1 is an isometric view of the final assembled form of a fiber optical engine of the present invention.

Referring now to FIG. 1, therein is shown an isometric view of the final assembled form of a fiber optical engine 10 of the present invention. The fiber optical engine 10 includes an optical element 12, a integrated circuit, transmitter, receiver, or transceiver, 14, an opto-electronic element 16, an electrical substrate 18, and a thermal substrate 20. The optical element 12, the integrated circuit 14, and the opto-electronic element 16 are "passively aligned", which means that the components are aligned during assembly to provide properly aligned light paths 22 through 26 among the various components of the fiber optical engine 10. The term "passively aligned" contrasts with "actively aligned" where the components are mechanically or electrically aligned after assembly.

As assembled, the light paths 22 through 26 define the optical path that describes the path of the photons coming from the opto-electronic element 16 into the optical element 12. The beam is split into two paths 23 and 24, one that hits the opto-electronic element 16 and another that is reflected to hit the integrated circuit 14. This allows formation of a complete optical path, allowing control of the behavior of the opto-electronic element 16 by the integrated circuit 14, which cannot be currently done in a conventional design and manufacturing approach.

Figure 2:
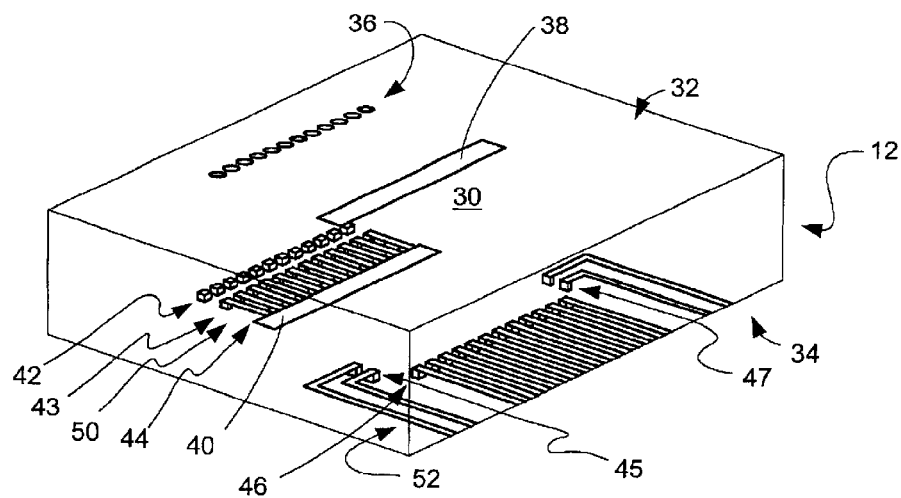
FIG. 2 is an isometric view of the optical element of the present invention.

Referring now to FIG. 2, therein is shown an isometric view of the optical element 12 of the present invention. The optical element 12 includes a transparent optical substrate 30 having top and bottom horizontal surfaces 32 and 34, respectively.

The term "horizontal" as used in this application is defined as a plane parallel to the conventional plane or surface of the transparent optical substrate 30, regardless of the orientation of the substrate. The term "vertical" refers to a direction perpendicular to the horizontal as just defined. Terms, such as "on", "side", "higher", "lower", "over", and "under" are defined with respect to the conventional plane or surface being on the top surface of the transparent optical substrate 30, regardless of the orientation of the substrate. For ease of understanding, similar structures in different embodiments have the same numbers, although it will be understood that each embodiment stands alone as an example of the present invention.

On the top horizontal surface 32 of the transparent optical substrate 30 are optics 36 and a top mirror 38. On the bottom horizontal surface 34 is a bottom mirror 40. Also on the bottom horizontal surface 34 are eutectic solder bumps 42 through 47. The solder bumps 43 and 44 are connected by conductive integrated circuit traces 50 and the solder bumps 45 through 47 are connected to conductive integrated circuit traces 52.

The transparent optical substrate 30 can be of any material which is transparent to the wavelength of light that the fiber optical engine 10 will be operating with, such as glass, quartz, sapphire, or silicon. The top and bottom mirrors 38 and 40 may be either etched or deposited using processes akin to semiconductor wafer processing. Similarly, the optics 36 could be etched or deposited in or on the transparent optical substrate 30. The various techniques for forming mirrors and optics are well known in the art. For example, refractive and diffractive lenses and stacks of lenses can be formed on the top and bottom horizontal surfaces 32 and 34. Also, the top and bottom mirrors 38 and 40 could also be formed as reflective lenses to provide improved control over the light path 22.

Figure 3:
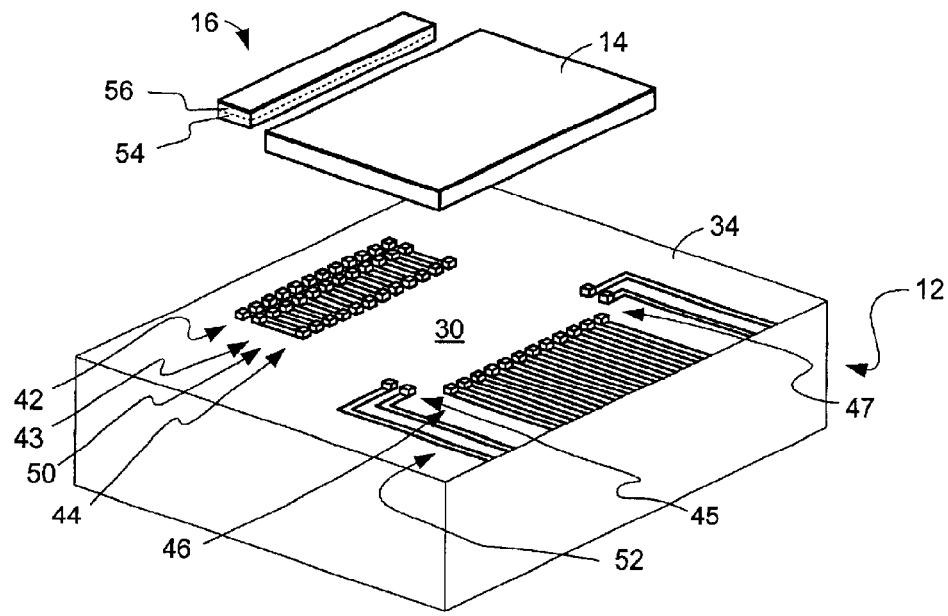
FIG. 3 is a view of components in an intermediate stage of assembly in accordance with the present invention.

Referring now to FIG. 3, therein are shown a number of components in an intermediate stage of assembly in accordance with the present invention. The optical element 12 is shown with the bottom horizontal surface 34 facing up.

The opto-electronic element 16 is in a position to be bonded to the solder bumps 42 and 43. The opto-electronic element 16 could be of a number of different types depending upon the particular application for the fiber optical engine 10. It can be either or both a light transmitting as well as light-receiving device. The functions are schematically illustrated as a light-emitting device 54 and a light-receiving device 56 in the opto-electronic element 16. The light-emitting device 54 could be an array of light-emitting diodes or surface emitting or edge emitting solid-state lasers. The light-receiving device 56 could be a photodiode such as a P/N junction. Essentially, the light-emitting device 54 converts electrical signals into light signals as a transmitter portion and the light-receiving device 56 converts light signals into electronic signals as the receiver portion.

Similarly, the integrated circuit 14 is positioned to be bonded to the solder bumps 44 through 47 on the transparent optical substrate 30. The integrated circuit 14 can be a receiver, transmitter, and/or controller semiconductor integrated circuit. On the topside of the integrated circuit 14 is a monitor diode array 15 (visible in FIG. 1), such as P/N junctions, which are photosensitive and convert photons to electrons.

The optics 36 is a specially designed diffractive optical element, but the art is well known in the community. The optics 36 is a diffractive optical element, which splits the beam, one through the main path. A small percentage of that energy is diverted back into the substrate. It bounces through mirrors. It could take more than one bounce. In addition, top and bottom mirrors 38 and 40 could incorporate in themselves focusing lenses which would prevent the beam from spreading as it traverses through the transparent optical substrate 30. It finally makes its way to the monitor diode array 15, which could be a P/N junction incorporated into the integrated circuit 14, at which point, photons are converted to electrons. That information is used to control the behavior of the transmitter or light-emitting device 54. This feedback loop allows changing the driving signal amplitude, its duration as well as its amplitude, depending upon the monitored intensity of the photons, or the optical energy.

The monitor diode array 15 could be incorporated into the integrated circuit 14 as shown or could be a separate element on its own, which could be separately bonded to the transparent optical substrate 30 with its own integrated circuit traces.

The bonding of the opto-electronic element 16 and the integrated circuit 14 to the optical element 12 in the above embodiment is accomplished through the self-alignment of contact pads on the components and the eutectic solder bumps on the transparent optical substrate 30. Very accurate alignment is initially not necessary. When the assembly is put through a reflow oven in which the solder bumps 42 through 47 are brought above their melting point, the surface tension of the molten solder pulls the opto-electronic element 16 and the integrated circuit 14 into correct alignment with the transparent optical substrate 30.

Figure 4:
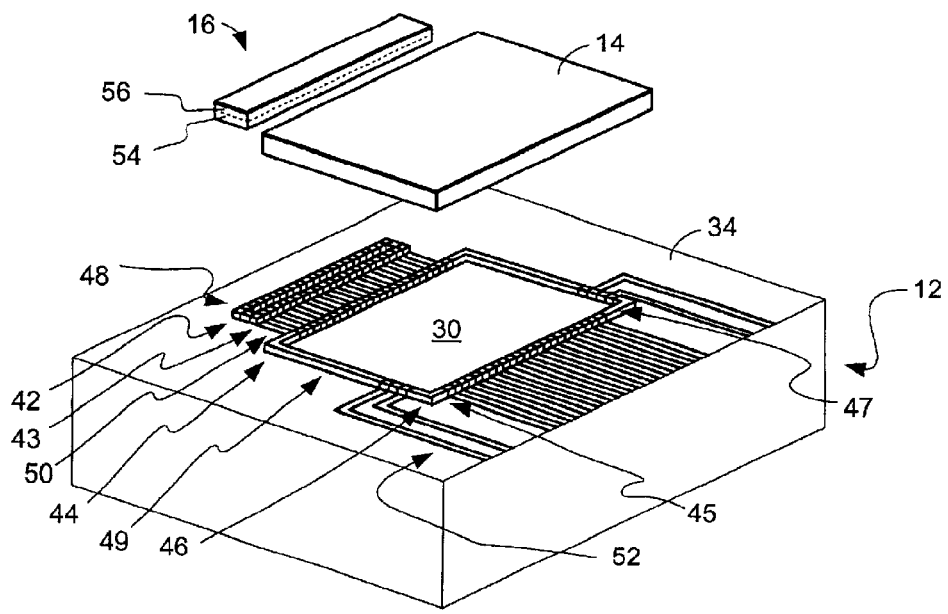
FIG. 4 is a view of components arranged in position for bonding in accordance with an alternate embodiment of the present invention.

Referring now to FIG. 4, therein are shown the components in a position for bonding in accordance with an alternate embodiment of the present invention. A layer of anisotropically conductive adhesive (ACA) is formed on the transparent optical substrate 30. The ACA may be stenciled or provided as a punched film to form ACA 48 and 49, which is placed between the solder bumps 42 and 43 in the shape of the opto-electronic element 16, or between the solder bumps 44 through 47 in the outline of the integrated circuit 14. The ACA 48 and 49 are then cured by exposure to heat or ultraviolet light depending on the specific type of ACA material. Ultraviolet light curing is preferred as the room temperature curing introduces less optical misalignment than heat curing due to the different thermal expansion coefficients of the various components.

Alignment in this embodiment is achieved by fiducials (conventional semiconductor alignment structures which are not shown), which are put on the surfaces of the components to be aligned. A load is then applied while the ACA 48 and 49 are cured.

Figure 5:
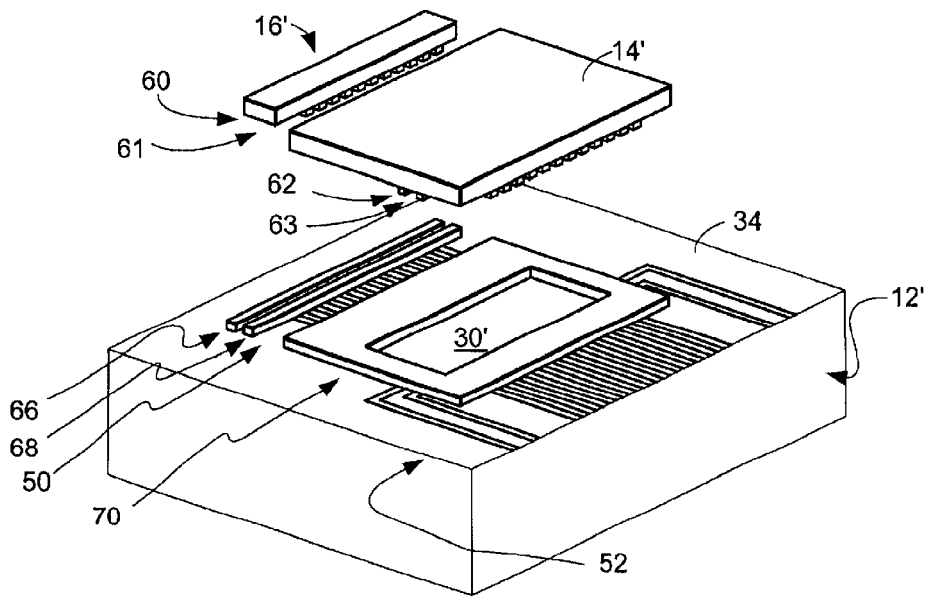
FIG. 5 is another view of components arranged for bonding in an alternate embodiment of the present invention.

Referring now to FIG. 5, therein are shown the components arranged to be bonded in an alternate embodiment of the present invention. Therein are shown an optical element 12', an integrated circuit 14', and an opto-electronic element 16'.

The integrated circuit 14' and the opto-electronic element 16' have wire bumps 60 through 63 formed on the optical element proximate sides thereof. The wire bumps 60 through 63 are formed by the process of taking the tail wires from ball bonds, cutting the tail wires, and flattening the tail wires to form the wire bumps.

On the bottom horizontal surface 34 of the transparent optical substrate 30, an ultraviolet or heat-cure adhesive layer is applied. The adhesive layer consists of an adhesive strip 66, an adhesive strip 68 over one end of the integrated circuit traces 50, and an adhesive wall 70 over the other end of the integrated circuit traces 50 and over the integrated circuit traces 52.

During the manufacturing process, the integrated circuit 14 and the opto-electronic element 16 are flip chip attached and held under load onto the transparent optical substrate 30. Alignment of the integrated circuit 14 and the opto-electronic element 16 to the transparent optical substrate 30 is accomplished by fiducials alignment marks or structures on the mating surfaces. The curing of the adhesive strips 66 and 68 and the adhesive wall 70 takes place while the components are held together. The shrinkage of the adhesive upon curing forces the wire bumps to make contact with the integrated circuit traces on the transparent optical substrate 30.

Figure 6:
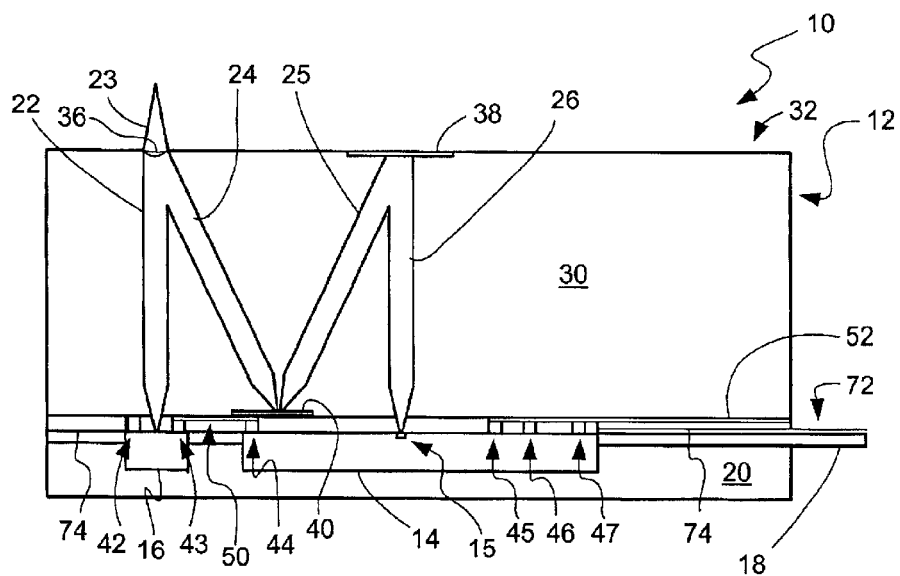
FIG. 6 is a schematic cross-sectional view of an assembled fiber optical engine according to the present invention.

Referring now to FIG. 6, therein is shown a schematic cross-sectional view of the assembled fiber optical engine 10 of FIG. 1 according to the present invention.

The optical element 12 with the integrated circuit 14 and the opto-electronic element 16 bonded thereto is secured to the electrical substrate 18, which may be a flexible tape having conductive traces 72 printed thereon. The optical element 12 is secured to the electrical substrate 18 by a curable anisotropically conductive adhesive 74, which is patterned on the electrical substrate 18 so as to be under the perimeter of the optical element 12.

The thermal substrate 20 is secured to the electrical substrate 18 in contact with both the integrated circuit 14 and the opto-electronic element 16 so as to remove generated heat and cool the components.

In operation, signals are received in on the conductive traces 72 and are conducted through the anisotropically conductive adhesive or through solder bumps 74 to the integrated circuit traces 52. The signals are then conducted through the integrated circuit traces 52 through the various solder bumps 45 through 47 into the integrated circuit 14. The signals are processed in the integrated circuit 14 and provided through the solder bumps 44, the integrated circuit traces 50, and the solder bumps 43 into the opto-electronic element 16 which, when acting as a transmitter, converts the electrical signals into light signals along the light path 22 in the transparent optical substrate 30.

At the optics 36, the majority of the light follows the light path 23 and a small portion is reflected along the light path 24 to the bottom mirror 40. The bottom mirror 40 reflects the light along the light path 25 to the top mirror 38, which reflects the light along the light path 26 to the monitor diode array 15 in the integrated circuit 14. The monitor diode array 15 allows feedback control by the integrated circuit 14 of the opto-electronic element 16.

Light incoming from a fiber optic cable to the fiber optical engine 10 will enter through the optics 36 and follow the light path 22 to the opto-electronic element 16 which acts as a receiver to convert light signals into electrical signals for passage through the solder bumps 43, the integrated circuit traces 50, and the solder bumps 44. The signals are processed in the integrated circuit 14 and then sent out through the solder bumps 45 through 47 to the integrated circuit traces 52. From the integrated circuit traces 52, the anisotropically conductive adhesive 74 transmits the signals to the conductive traces 72 on the electrical substrate 18.

The integrated circuit 14 continuously adjusts the light output of a plurality of channels of the opto-electronic element 16 through the monitor diode array 15. The use of the top and bottom mirrors 38 and 40 of the transparent optical substrate 30 facilitates the signal feedback by redirecting a partial light beam from the opto-electronic element 16 onto the monitor diode array 15.

As will be evident to those skilled in the art, shorter interconnections provided by the solder bumps instead of bond wires result in reduced parasitic capacitances between the bond wires and permits the fiber optical engine to operate at high gigahertz speeds; i.e. electromagnetic radiation is suppressed when bond wires are not present.

A major advantage of the present invention is that alignment of all key components can be achieved passively. All equipment and materials used are commercially available. Similarly the assembly processes are widely used.

Also as would be evident to those skilled in the art, the opto-electronic element 16 and the integrated circuit 14 could be performed on a wafer size transparent optical substrate 30. This wafer scale manufacturing would provide for higher throughput during manufacturing.

Finally, a lower cost final product results from pretestability of the fiber optical engine 10 while still at the wafer level. Burn-in of the fiber optical engine 10 can take place and only good units can be used to manufacture the final fiber optic product.

In a manufacturing environment for one embodiment, parts are attached in sequence beginning with optical element 12 and ending with thermal substrate 20.

First, what is called an under-filling process or glue-down process is used through which polymer based adhesives are dispensed along the edges of the integrated circuit 14 and the opto-electronic element 16 to secure it onto the optical element 12.

Second, the integrated circuit 14 and the opto-electronic element 16 are bonded by a flip chip process or die attached onto the optical element 12.

Third, the composite structure of the integrated circuit 14, the opto-electronic element 16, and the optical element 12 are then die attached using the anisotropically conductive adhesive 74 onto the electrical substrate 18, which is a substrate which could be a PC board, flexible laminate, ceramic material, or any substrate on which conductive traces can be placed to conduct electrons from the composite structure to the outside world.

Fourth, the thermal substrate 20 is attached to the integrated circuit 14 and the opto-electronic element 16 as a means of thermal management.

The advantages of the present invention over existing approaches are: 1) higher efficiency; 2) occupies much smaller volume; 3) there are only two alignments; i.e., optical alignment steps that need to be done, namely assembling the opto-electronic element 16 onto the optical element 12, followed by the assembly or die attachment of the integrated circuit 14. This is all done in micron level accuracy, which leads to very high placement precision, which ultimately leads to very low cost.

The opto-electronic element 16 can be not only a linear array but also a multi-dimensional array of light-emitting devices, which could work at the same or different frequencies.

Assembly can be done at the wafer scale level. That is, a wafer size optical element 12 is used, die attach the semiconductor components at the wafer level, encapsulate it, test it at the wafer level, ink the bad locations, and then treat it much like a standard wafer, singulate and then go through subsequent assembly steps.

Figure 7:
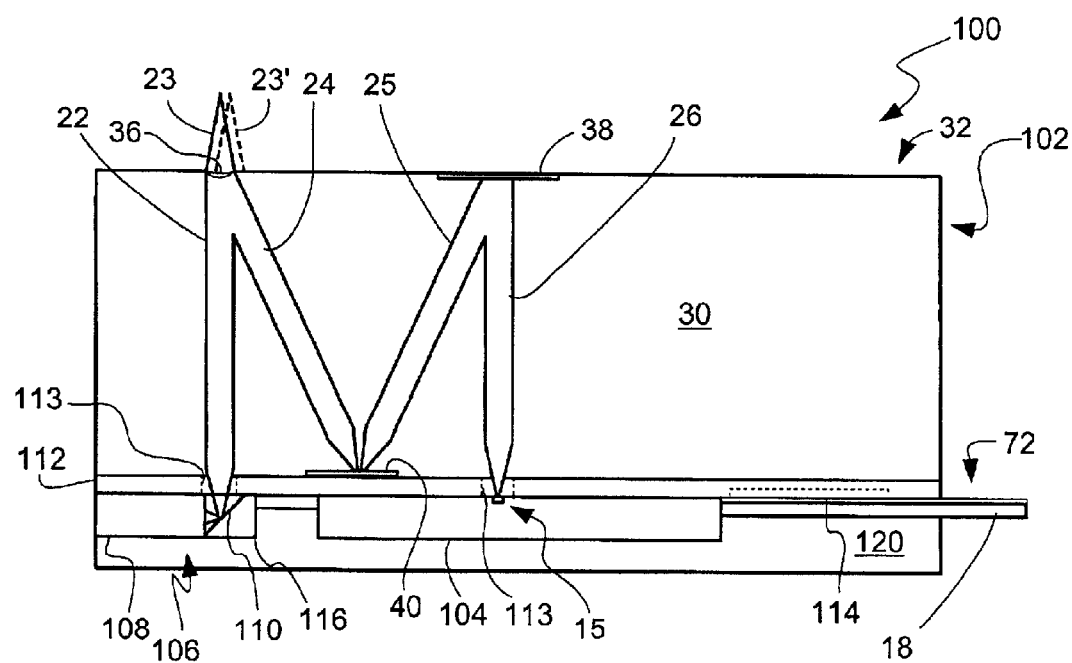
FIG. 7 is a cross-sectional view of the final assembled form of a fiber optical engine of an alternate embodiment of the present invention.

Referring now to FIG. 7, therein is shown a cross-sectional view of the final assembled form of a fiber optical engine 100 of an alternate embodiment of the present invention. The fiber optical engine 100 includes an optical element 102, an integrated circuit 104, an opto-electronic element 106, a circuit substrate 112, an electrical substrate 18, and a thermal substrate 120. The circuit substrate 112, the integrated circuit 104, and the optoelectronic element 106 are "passively aligned", which means that the components are aligned 23 during assembly so as to be able to provide properly aligned light paths 22 through 26 among the various components of the fiber optical engine 100 when aligned with the optical element 102.

The circuit substrate 112 could be of silicon, sapphire, or ceramic. The circuit substrate 112 contains electrical traces, which are transparent to the wavelengths of light in the light paths 22 through 26. In cases where the circuit substrate material 112 is not transparent to the wavelengths of light in the light paths 22 through 26, optional openings 113 are created through the circuit substrate 112 by means of mechanical process, or chemical wet or dry etch process. The integrated circuit 104 and the opto-electronic element 106 are assembled as well as other components 114, passive elements for example, onto the circuit substrate 112. Then the transparent optical substrate 30 is aligned and bonded to the circuit substrate 112. One advantage in that approach is the manufacturing design of the transparent optical substrate 30 becomes much simpler because the solder bumps 42 through 47 and the integrated circuit traces 50 and 52 shown in FIGS. 3–5 are no longer required.

The circuit substrate 112 can be a standard silicon wafer, which will provide, with attachment pads, multiple layers of interconnect, as well as both active and passive elements in addition to element integrated circuit 104. For example, filters, charge pumps, voltage regulators, etc. can be incorporated using the circuit substrate 112 as a common electrical substrate. As a result, the fiber optical engine 100 is a complete fiber optic system, which is self-sufficient in functionality on its own as well as being capable of being manufactured at the wafer scale level.

The opto-electronic element 106 (transmitter, receiver, and/or transceiver) can use a transmitter, which is an edge emitting light source 108 instead of a surface emitting light source. The edge emitting light source 108 will also be attached in the same fashion as a surface element but utilizing a prism or a mirror 110 that will deflect the beam at a 90-degree angle allowing a much wider variety of light-emitting devices to be used. The mirror 110 could be a polymer or a directly etched mirror on the transparent optical substrate 30 or on the circuit substrate 112.

In addition, micro mechanical elements 116, such as moveable and/or tunable mirrors, could be incorporated into or on the circuit substrate 112 allowing active movement of the light path 22 to change the alignment or compensate for any misalignment of the light relative to the optical fiber on a real-time basis using optical feedback, or electrically tuned or moved mirrors could be used to move light from optical fiber to optical fiber such that the fiber optical engine 100 can also be used as a switch.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

What is claimed is:

1. A method for manufacturing a fiber optical engine comprising:

providing an optical element having an optical substrate and optics;

providing an opto-electronic element for converting between light and electronic signals;

providing an integrated circuit for controlling the opto-electronic element, providing the integrated circuit includes providing photosensitive devices therein for providing feedback for controlling the opto-electronic element;

passively aligning the opto-electronic element with the optics;

securing the opto-electronic element to the optical substrate;

securing the integrated circuit to the optical substrate;

providing an electrical substrate; and securing the electrical substrate and the optical element.

2. The method as claimed in claim 1 including:

passively aligning the integrated circuit with the optics.

3. The method as claimed in claim 1 wherein:

providing the optical element includes providing the optical substrate with mirrors in alignment with the optics.

4. The method as claimed in claim 1 wherein:

providing the optical element includes forming conductive traces and bumps on the electrical substrate for connecting the opto-electronic element and the integrated circuit to the optical element in passive alignment.

5. The method as claimed in claim 1 wherein:

providing the opto-electronic element includes forming wire bumps thereon;

providing the integrated circuit includes forming bumps thereon; and providing the optical element includes forming conductive traces on the optical substrate for connecting the opto-electronic element and the integrated circuit to the optical element in passive alignment.

6. The method as claimed in claim 1 wherein:

securing the opto-electronic element and the integrated circuit to the optical element includes:

depositing an anisotropically conductive ultra-violet or heat curable adhesive on the optical substrate;

positioning the opto-electronic element and the integrated circuit to the optical element for assembly; and curing the anisotropically conductive ultra-violet or heat curable adhesive.

7. The method as claimed in claim 1 wherein:

providing the electrical substrate includes providing the electrical substrate longer than the optical element and forming conductive traces thereon extending beyond the optical element when the optical element is secured to the electrical element; and securing the electrical substrate and the optical element includes:

depositing an ultra-violet or heat curable adhesive on the optical substrate;

positioning the opto-electronic element and the integrated circuit to the optical element for assembly; and curing the ultra-violet or heat curable adhesive.

8. The method as claimed in claim 1 including:
providing a thermal substrate in contact with the opto-electronic element and the integrated circuit.

9. The method as claimed in claim 1 including:
providing a circuit substrate in contact with the opto-electronic element and the integrated circuit and having associated therewith elements selected from a group consisting of conductive traces, filters, charge pumps, voltage regulators, mirrors, prisms, micro mechanical elements, active elements, passive elements, and a combination thereof.

10. The method as claimed in claim 1 wherein:
providing the optical element provides the optical substrate as a wafer; and
securing the opto-electronic element and the integrated circuit includes securing a plurality of opto-electronic elements and a plurality of integrated circuits to the optical substrate as a wafer;
and including;
testing the plurality of opto-electronic elements and the plurality of integrated circuits on the optical substrate as a wafer; and
singulating the optical substrate.

11. A fiber optical engine comprising:
an optical element having an optical substrate and optics;
an opto-electronic element for converting between light and electronic signals, the opto-electronic element secured to the optical substrate and passively aligned with the optics;
an integrated circuit for controlling the opto-electronic element, the integrated circuit secured to the optical substrate, the integrated circuit includes photosensitive devices therein for providing feedback for controlling the opto-electronic element; and
an electrical substrate secured to the optical element.

12. The fiber optical engine as claimed in claim 11 wherein:
the integrated circuit is passively aligned with the optics.

13. The fiber optical engine as claimed in claim 11 wherein:
the optical element includes the optical substrate with mirrors in alignment with the optics.

14. The fiber optical engine as claimed in claim 11 wherein:
the optical element includes conductive traces and bumps for connecting the opto-electronic element and the integrated circuit to the optical element in passive alignment.

15. The fiber optical engine as claimed in claim 11 wherein:
the opto-electronic element includes wire bumps thereon;
the integrated circuit includes bumps thereon; and
the optical element includes conductive traces on the optical substrate for connecting the opto-electronic element and the integrated circuit to the optical element in passive alignment.

16. The fiber optical engine as claimed in claim 11 including:
an anisotropically conductive ultra-violet or heat curable adhesive on the optical substrate securing the opto-electronic element and the integrated circuit to the optical element.

17. The fiber optical engine as claimed in claim 11 wherein:
the electrical substrate is longer than the optical element and includes conductive traces thereon extending beyond the optical element with the optical element secured to the electrical element;
and including:
an ultra-violet or heat curable adhesive on the optical substrate securing the opto-electronic element and the integrated circuit to the optical element.

18. The fiber optical engine as claimed in claim 11 including:
a thermal substrate in contact with the opto-electronic element and the integrated circuit.

19. The fiber optical engine as claimed in claim 11 including:
a circuit substrate in contact with the opto-electronic element and the integrated circuit and having associated therewith elements selected from a group consisting of conductive traces, filters, charge pumps, voltage regulators, mirrors, prisms, micro mechanical elements, active elements, passive elements, and a combination thereof.

20. The fiber optical engine as claimed in claim 11 including:
a circuit substrate having transparent conductive traces thereon; and
the circuit substrate includes selecting the circuit substrate from a group of materials consisting of silicon, sapphire, and ceramic.

* * * * *